United States Patent [19]

Ruch et al.

[11] Patent Number: 4,463,064

[45] Date of Patent: Jul. 31, 1984

[54] GALVANIC ELEMENT, ESPECIALLY METAL-AIR-CELL

[75] Inventors: Jean Ruch; Detlef Katryniok, both of Brilon; Hugo Pack, Brilon-Bontkirchen; Heinz-Günther Tillmann, Geseke, all of Fed. Rep. of Germany

[73] Assignee: Accumulatorenwerke Hoppecke Carl Zoellner & Sohn GmbH & Co. KG, Brilon, Fed. Rep. of Germany

[21] Appl. No.: 493,354

[22] Filed: May 10, 1983

[30] Foreign Application Priority Data

May 15, 1982 [DE] Fed. Rep. of Germany ....... 3218410

[51] Int. Cl.³ .................... H01M 2/00; H01M 6/48
[52] U.S. Cl. ....................... 429/27; 429/39; 429/72; 429/120; 429/210; 204/255
[58] Field of Search ............. 429/27, 34, 35, 38, 429/39, 721, 120, 210; 204/254, 255, 263, 279

[56] References Cited

U.S. PATENT DOCUMENTS

| 4,124,478 | 11/1978 | Tsien et al. ................ 429/39 X |
| 4,152,492 | 5/1979 | McCartney et al. ........... 429/210 X |
| 4,310,605 | 1/1982 | Early et al. ............... 429/39 X |

FOREIGN PATENT DOCUMENTS 1555973 11/1979 United Kingdom .
1558081 12/1979 United Kingdom .
2084387 4/1982 United Kingdom .

*Primary Examiner*—Anthony Skapars
*Attorney, Agent, or Firm*—Becker & Becker, Inc.

[57] ABSTRACT

A galvanic element in the form of a flat, high power cell, especially a metal-air-cell, which is cooled with cooling water, and can be assembled to a battery which comprises a plurality of cells. The flat cell comprises bipolar electrodes which have a consumable metal electrode in flat form as an anode, a cathode (oxygen electrode), and a liquid electrolyte. It is an object of the present invention to be able to control the temperature, especially for cooling, of each individual electrode directly by means of a medium which is independent of the liquid electrolyte. For this purpose, the bipolar electrodes are electrically interconnected, and between them is arranged a gasket which forms a cooling chamber. As a result, the heat balance and temperature of not only the anode but also of the cathode can be controlled directly.

11 Claims, 5 Drawing Figures

GALVANIC ELEMENT, ESPECIALLY METAL-AIR-CELL

BACKGROUND OF THE INVENTION

The present invention relates to a galvanic element in the form of a flat, high power cell, especially a metal-air-cell; the flat cell is cooled with cooling water, and can be assembled to a battery of a plurality of cells; furthermore, the flat cell comprises bipolar electrodes, with a consumable metal electrode in flat form as an anode, a cathode, especially an oxygen electrode, and a liquid electrolyte.

U.S. Pat. No. 4,152,492 discloses a water-cooled battery comprising a plurality of bipolar electrodes. The bipolar electrodes are assembled into modules, and are stacked in an arrangement parallel to one another. Cooling medium water flows around the individual modules. A drawback to this heretofore known battery is that a direct cooling of the individual bipolar electrodes is not effected, so that dissipation of heat is only effected for the overall module. Thus, the same effect is achieved as is known with galvanic elements for cooling the electrolyte. Such a proposal also does not suffice for flat, high power cells, and in particular does not permit the electrochemical processes at the site of the reaction itself to be affected by control of the heat.

It is an object of the present invention to provide a flat, high power cell of the aforementioned general type in which the temperature of each electrode can be individually controlled, especially cooled, directly by a medium which is independent of the liquid electrolyte.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
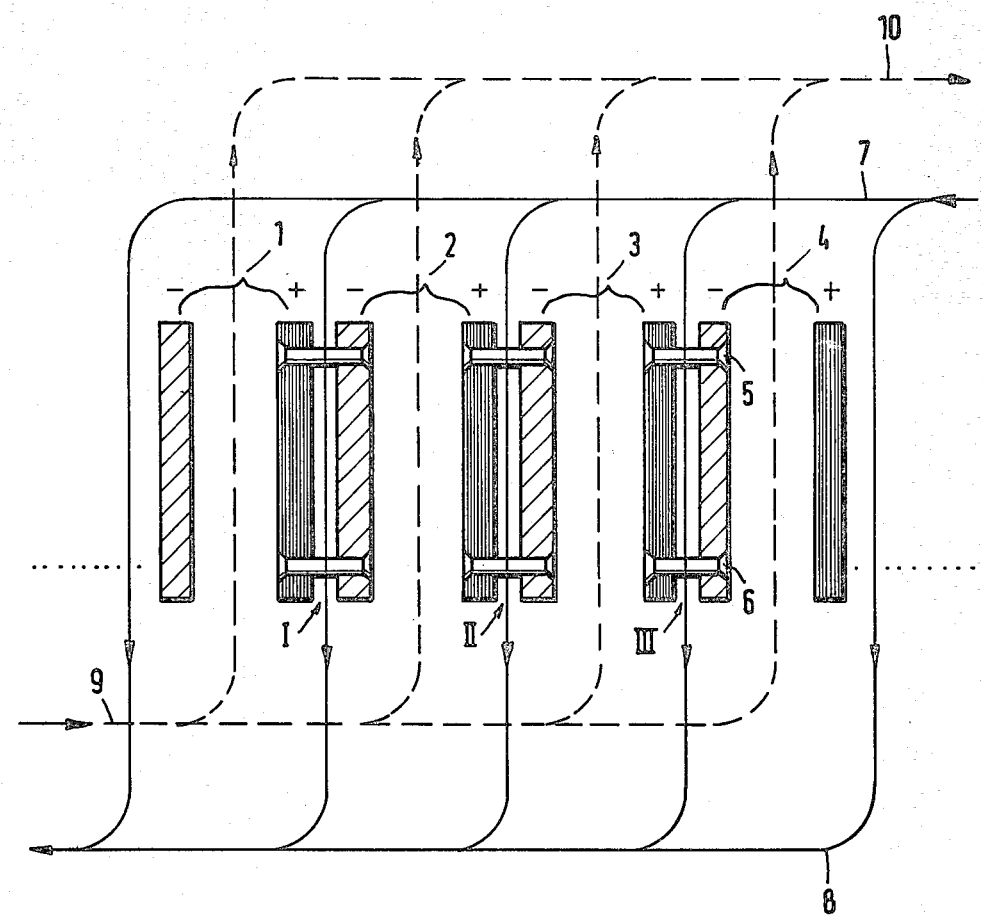
FIG. 1 schematically illustrates a battery which comprises a plurality of inventive galvanic bipolar elements.

The galvanic element of the present invention is characterized primarily in that the bipolar electrodes are electrically interconnected, and in that between them is arranged a gasket which forms a cooling chamber. With this proposal it is possible for the first time to directly control not only the anode but also the cathode with regard to their heat balance and their temperature, and to achieve higher powers or outputs, because the temperature control is effected in the utmost vicinity of the site of the reaction.

Preferably, the battery, which is assembled from inventive flat, high power cells, is electrically connected in series, and, with regard to the supply with cooling medium, electrolyte, and oxygen/air, is connected in parallel, as a result of which a compact structural unit can be obtained.

Pursuant to an expedient embodiment of the present invention, the anode comprises a metal plate, especially a square aluminum plate; the gasket which forms the cooling chamber is correspondingly shaped, with the cooling medium chamber representing a centrally closed cutout in the gasket which is at least as great as the active electrode surface; and the cathode is a flat oxygen electrode, the frame of which is conductively connected with the anode, preferably by a pressure connection, particularly by riveting.

It is advantageous to also provide the electrolyte chamber in the form of a central cutout in a flat gasket which is arranged on the active side of the anode. The described total components are assembled into an exceptionally flat bipolar element which is square or rectangular in the concrete embodiment, and which forms a battery when combined with further similarly constructed elements. In the element, the border regions of the gasket which forms the electrolyte chamber, of the anode, of the gasket which forms the cooling chamber, and of the cathode are provided for supplying and withdrawing media, as well as for electrical connection. For this purpose, cooperating bores are preferably placed in the border region; by means of cross channels in the two gaskets and the frame of the oxygen electrode, these bores assure the supply of media to the electrolyte chamber, to the cooling chamber, and to the oxygen chamber of the oxygen electrode. The bores are connected with appropriate media-collecting lines.

A particularly advantageous embodiment of the electrolyte supply and withdrawal to the electrolyte chamber is achieved by providing a plurality of parallel notches in the inner peripheral wall of the gasket; these notches are respectively connected to a separate electrolyte supply and withdrawal bore in order to effect a favorable distribution of the electrolyte in the electrolyte chamber. The flow in the electrolyte chamber is expediently directed from the bottom to the top.

A preferred embodiment of the gasket which forms the cooling chamber provides for diagonally oppositely located cross channels for the supply and withdrawal of cooling medium, with the flow through the cooling chamber being effected from the top toward the bottom. These measures result in an intensive supply of the adjacent bipolar electrodes with cooling medium.

In place of the preferred embodiment of the anode of solid metal, an anode in sintered form can also be used; similarly, in place of the preferred embodiment of a cathode which is operated with oxygen or air, a cathode of, for example, silver oxide can also be used. The liquid electrolyte, generally KOH, is expediently circulated, although other methods are also possible. As a whole, with the proposal of the present invention, a considerable improvement of the control of the heat balance of the individual elements of the galvanic element is achieved, with short paths for the flow and a direct current transfer from one cell to another representing an accomplished advantage. Due to the design of the cutout of the gasket which forms the electrolyte chamber, the flow conditions of the electrolyte can be influenced for the purpose of reducing shunt flows. The structural configuration is simple, and is easy to manufacture and assemble. An expansion or reduction of the dimensions (capacity) of the battery is possible in a simple manner, so that without special measures batteries of a particular size can be assembled.

DESCRIPTION OF A PREFERRED EMBODIMENT

Referring now to the drawings in detail, the battery of FIG. 1 comprises bipolar galvanic elements I, II, and III, as well as further appropriate devices which are not illustrated yet are represented by the dots. In the battery, the electrically cooperating cells are clearly indicated by brackets, and are designated by the reference numerals 1, 2, 3, and 4. In the bipolar elements I, the anodes and cathodes are respectively electrically interconnected by means of rivets 5 and 6. A seal or gasket is arranged between the electrodes; this seal or gasket will be subsequently described in detail, and forms a cooling chamber through which cooling medium flows. The cooling medium passes from above out of a collecting line 7 to the respective cooling chambers, and is withdrawn below in a collecting line 8. Between the bipolar elements I/II and II/III, i.e. within the cells, an electrolyte flow is maintained by circulating liquid potassium hydroxide. The electrolyte chambers are formed by a seal or gasket which will also be subsequently described. The electrolyte chambers are connected below to one or more electrolyte supply lines 9, and above to electrolyte withdrawal lines 10. Furthermore, the battery has a non-illustrated oxygen feed and withdrawal to the cathodes, which are gas-diffusion electrodes, especially oxygen electrodes. FIG. 1 schematically illustrates that the elements of the battery are electrically connected in series, and for the purpose of supply are connected in parallel.

Figure 2:
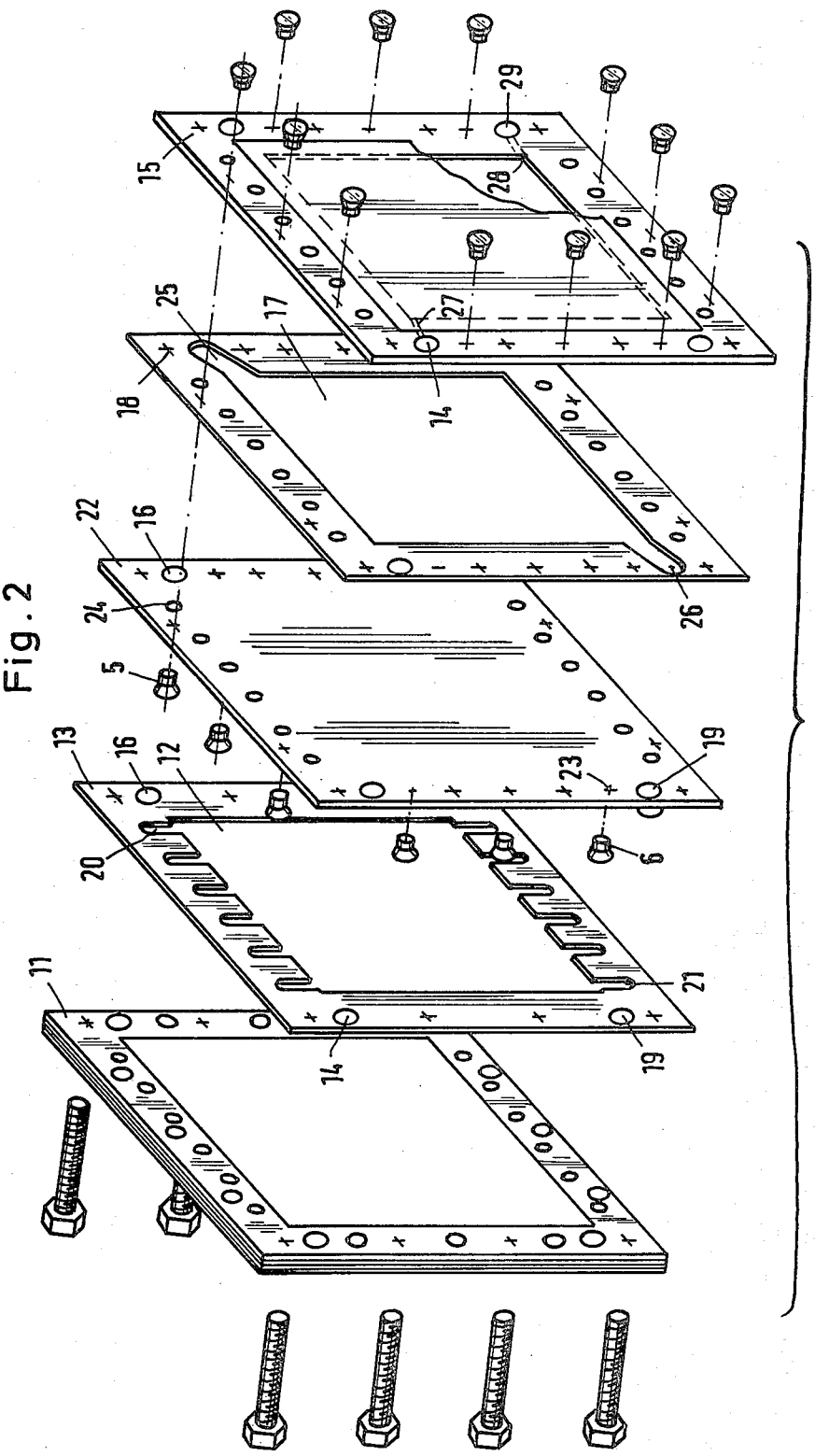
FIG. 2 is an exploded view of one embodiment of an inventive galvanic bipolar element.

One bipolar element I, II, or III of the battery is shown in detail in an exploded view in FIG. 2. The composition of the high-power flat cell can be seen from the assembled illustration of the four individual plate-like parts in the left portion of FIG. 2. The assembled flat cell is designated by the reference numeral 11.

The electrolyte chamber 12 is formed by a square, frame-like flat gasket 13 by cutting out a square central region, the size of which corresponds to the active surfaces of the electrodes. The flat gasket 13 comprises rubber or rubber-like material, and is provided in the border region with a plurality of bores which serve for fastening or for the supply of media. A bore 14 is provided for supplying oxygen to an oxygen electrode 15; a bore 16 is provided for supplying cooling medium to a flat gasket 18 which forms a cooling chamber 17; and a bore 19 is provided for the withdrawal of cooling medium. Furthermore, notches 20, 21 which are open toward the electrolyte chamber 12 are formed on the upper and lower inner peripheral region of the flat gasket 13. The lower notches 21 serve for supply of electrolyte, and the upper notches 20 serve for withdrawal of the electrolyte. The notches 20, 21 cooperate with yet to be described bores in the other parts of the bipolar elements, which bores are connected to a non-illustrated electrolyte storage tank which is provided with a pump.

Adjacent to the flat gasket 13, which forms the electrolyte chamber 12, is a flat, square or rectangular, consumable aluminum electrode (anode) 22. The electrode 22 comprises high-purity aluminum, and the outer border thereof is provided with a plurality of bores for fastening means and for the supply and withdrawal of media. Rivets 5, 6 are indicated schematically, but not completely, by way of example; these rivets 5, 6 electrically conductively connect the aluminum electrode 22 with the oxygen electrode 15. This type of connection represents a pressure connection of the bipolar electrodes accompanied by a sealing engagement of the flat gasket 18 which forms the cooling chamber 17. Bores through which the rivets 5, 6 pass are not indicated, but rather are diagrammatically represented by crosses 23. In contrast, the bores which form the electrolyte channels 24 are illustrated, since these bores serve for the supply and withdrawal of electrolyte to and from the electrolyte chamber 12.

The flat gasket 18, which forms the cooling chamber 17, is arranged adjacent to the aluminum electrode 22; the border region of the flat gasket 18 is again provided with bores which are not described in detail in order to eliminate repetition. However, one thing which is to be mentioned is that diametrically oppositely arranged cross channels 25 and 26 are provided for the supply and withdrawal of cooling medium. These cross channels 25, 26 are open toward the cooling chamber 17, and are formed in the gasket 18 in the form of notches. The cross channels 25, 26 communicate with the bores 16, 19 for supply and withdrawal of cooling medium respectively. The gasket 18 itself comprises an elastomer. As can be seen, in the assembled state the cooling chamber 17 provides for direct contact of the cooling medium with the aluminum electrode 22 on one side, and the oxygen electrode 15 on the other side.

The oxygen electrode 15 which is arranged adjacent to the flat gasket 18 comprises a similarly square, flat frame of metal for withdrawal of flow, and is provided with an oxygen chamber of aluminum, and a welded-on active foil. Oxygen or air is supplied to the oxygen chamber from above through the oxygen supply bore 14 via a cross channel 27, and the oxygen or air is withdrawn via a diametrically oppositely arranged cross channel 28 and an oxygen withdrawal bore 29.

Figure 3:
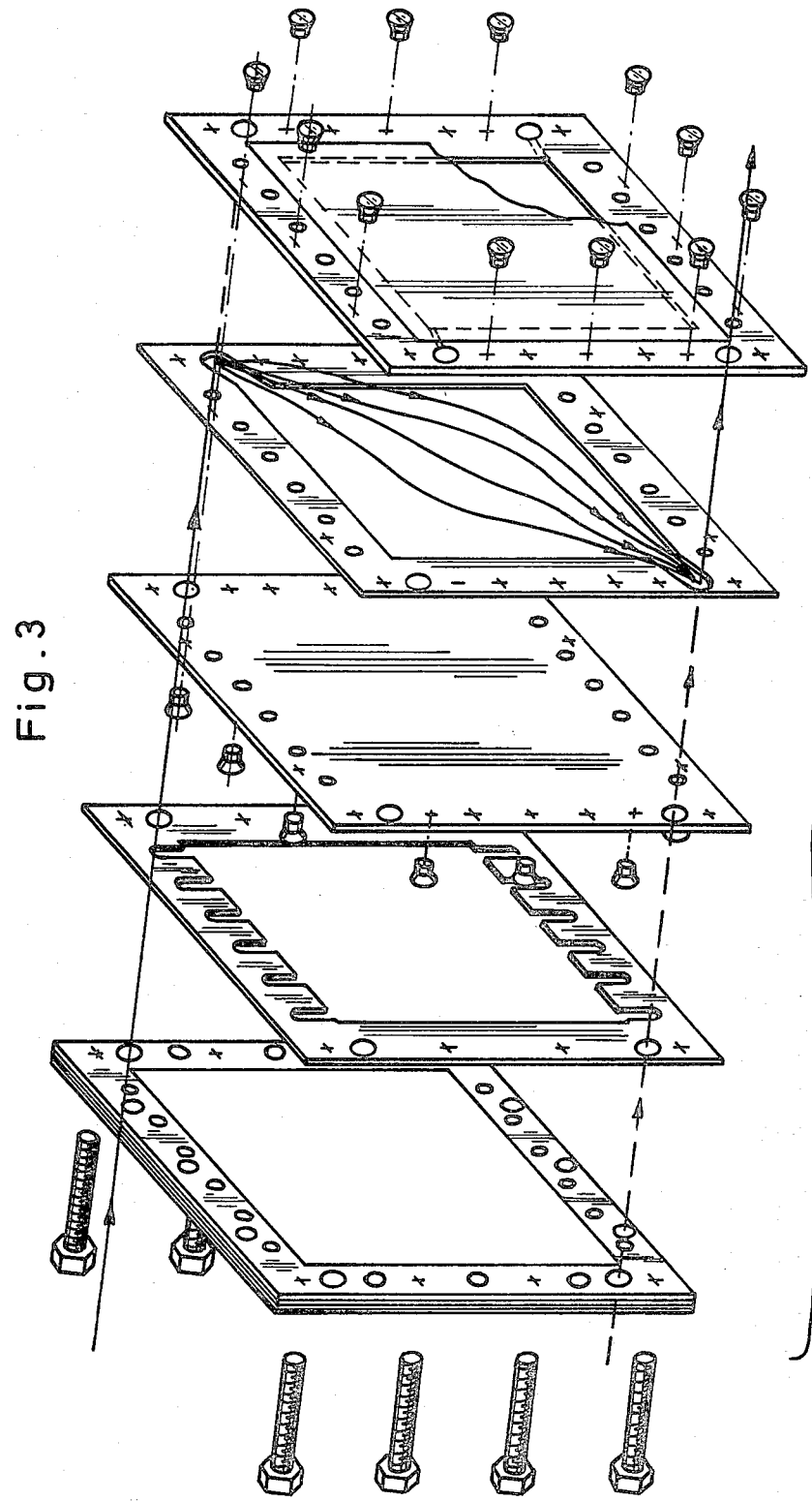
FIG. 3 shows the bipolar element of FIG. 2, and illustrates the flow of cooling medium.
Figure 4:
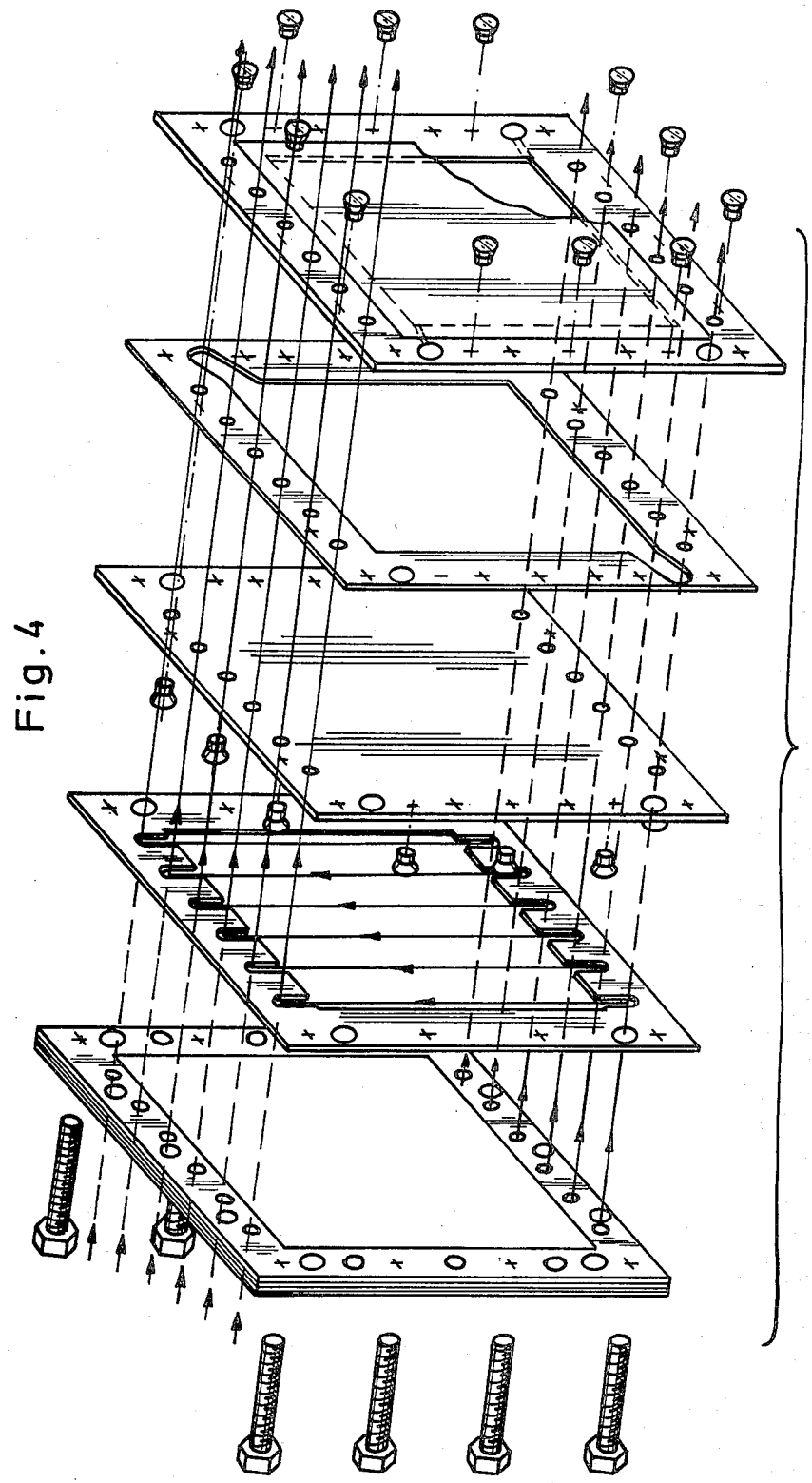
FIG. 4 shows the bipolar element of FIG. 2, and illustrates the circulation of electrolytes.
Figure 5:
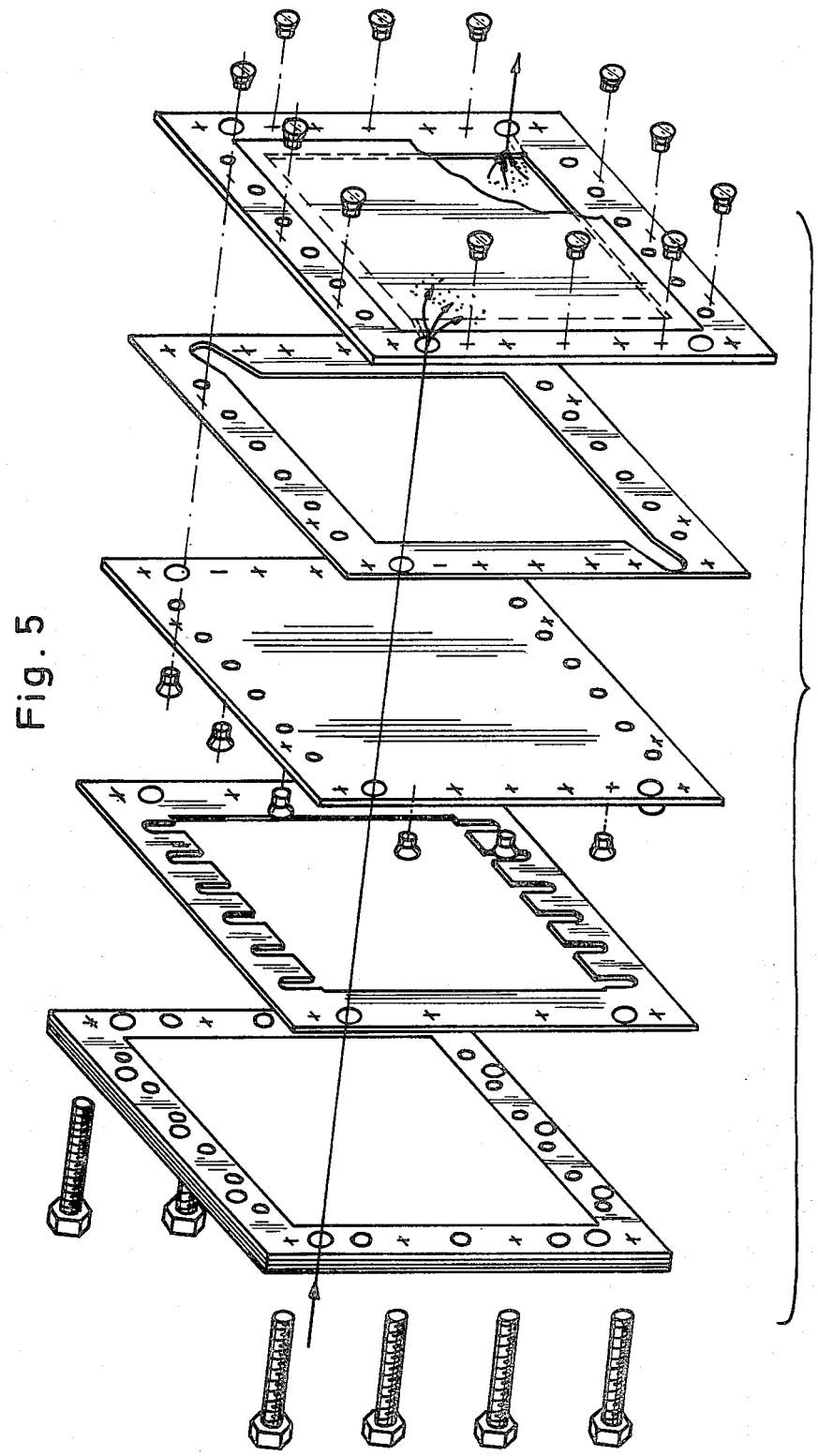
FIG. 5 shows the bipolar element of FIG. 2, and illustrates the circulation of oxygen.

The flow of the various media through the flat cell 11 can be seen from FIGS. 3, 4, and 5. FIG. 3 shows how the cooling medium is supplied from a collecting line 7, through the cooperating bores arranged at the top in the individual parts of the cell, and to the cooling chamber 17, where, in a well distributed manner, the cooling medium flows from the top toward the bottom while cooling the hot back side of the active working surface of the aluminum electrode 22; at the bottom, the cooling medium is withdrawn via the collecting line 8.

FIG. 4 clearly shows the circulation of the electrolyte through the bottom bores into the electrolyte chamber 12, with a good distribution of the medium being achieved due to the individual supply. The electrolyte flows upwardly through the electrolyte chamber 12 and leaves the latter from above through the withdrawal bores of the cell in conformity with the direction of the arrows; the electrolyte can subsequently be collected in collecting lines and a tank which is provided with a pump.

The circulation of the oxygen through the cell is clearly shown in FIG. 5. The oxygen circulates through the oxygen chamber of the electrode 15 from above toward the bottom accompanied by good distribution and contact of the active material. Supply and withdrawal is effected in collecting lines.

Thus, in order to function it is only necessary to circulate electrolyte, to supply oxygen, and to carry out control of the temperature by means of cooling medium in conformity with the output design of the battery.

The present invention is, of course, in no way restricted to the specific disclosure of the specification and drawings, but also encompasses any modifications within the scope of the appended claims.

What we claim is:

1. A galvanic bipolar element in the form of a flat, high power cell which is cooled with a cooling medium, utilizes a liquid electrolyte, and can be assembled with other such cells to form a battery; said element comprising:

bipolar electrodes, including a flat, consumable metal electrode as an anode, and a cathode, with said anode and said cathode being electrically interconnected; and a gasket disposed between said anode and said cathode, and forming a cooling chamber.

2. A galvanic element according to claim 1, in which said cathode is an oxygen electrode; in which, in a battery composed of a plurality of said elements, the elements are electrically connected in series; and in which, for supply thereto of cooling medium, electrolyte, and oxygen, said elements are connected in parallel.

3. A galvanic element according to claim 2, in which said anode is a square metal plate; in which said gasket which forms said cooling chamber has a corresponding shape, with said cooling chamber being a central closed cutout in said gasket, said cooling chamber being at least as large as the active electrode surface; and in which said cathode is a a flat oxygen electrode having a frame which is electrically conductively connected with said anode.

4. A galvanic element according to claim 3, in which said anode is an aluminum plate.

5. A galvanic element according to claim 3, in which said electrical interconnection of said anode with said cathode is effected by a pressure connection.

6. A galvanic element according to claim 5, in which said interconnection is effected by riveting.

7. A galvanic element according to claim 3, which includes a flat further gasket disposed on the active side of said anode remote from said first-mentioned gasket, with said further gasket being provided with an electrolyte chamber in the form of a central cutout therein.

8. A galvanic element according to claim 7, in which the border regions of said further gasket which forms said electrolyte chamber, of said anode, of said gasket which forms said cooling chamber, and of said cathode respectively include means for the supply and withdrawal of media, as well as for electrical connection.

9. A galvanic element according to claim 8, in which said cathode includes an oxygen chamber; and in which said means includes cooperating bores in said border regions, and channels in both of said gaskets and in said frame of said cathode for assuring supply of media to said electrolyte chamber, to said cooling chamber, and to said oxygen chamber, as well as assuring media withdrawal.

10. A galvanic element according to claim 9, in which said channels in said further gasket for the supply and withdrawal of electrolyte to said electrolyte chamber thereof include a plurality of notches in the inner peripheral wall of said further gasket; said notches are disposed parallel to one another, and are respectively connected to separate electrolyte supply and withdrawal bores in said further gasket; flow of electrolyte in said electrolyte chamber is from the bottom toward the top.

11. A galvanic element according to claim 10, in which said channels in said gasket which forms said cooling chamber are oppositely disposed cross channels for the supply and withdrawal of cooling medium; flow of cooling medium through said cooling chamber is from the top toward the bottom.

* * * * *

UNITED STATES PATENT AND TRADEMARK OFFICE
CERTIFICATE OF CORRECTION

PATENT NO. : 4,463,064
DATED : July 31, 1984
INVENTOR(S) : JEAN RUCH ET AL

It is certified that error appears in the above-identified patent and that said Letters Patent is hereby corrected as shown below:

On the Title-Abstract page at [75], the correct spelling of the name of one of the inventors is: Heinz-Günter Tillmann.

Signed and Sealed this

Thirtieth Day of July 1985

[SEAL]

Attest:

DONALD J. QUIGG

Attesting Officer     Acting Commissioner of Patents and Trademarks